R. D. SHIREY.
CUSHION TIRE.
APPLICATION FILED NOV. 15, 1916.

1,236,490.

Patented Aug. 14, 1917.
2 SHEETS—SHEET 2.

Inventor
R. D. SHIREY
By Watson E. Coleman
Attorney

UNITED STATES PATENT OFFICE.

RALPH DEAN SHIREY, OF WOODLAND, PENNSYLVANIA.

CUSHION-TIRE.

1,236,490. Specification of Letters Patent. Patented Aug. 14, 1917.

Application filed November 15, 1916. Serial No. 131,497.

*To all whom it may concern:*

Be it known that I, RALPH DEAN SHIREY, a citizen of the United States, residing at Woodland, in the county of Clearfield and State of Pennsylvania, have invented certain new and useful Improvements in Cushion-Tires, of which the following is a specification, reference being had to the accompanying drawings.

This invention relates to certain improvements in cushion tires and it is an object of the invention to provide a novel and improved tire of this general character whereby the shocks or jars incident to travel are substantially entirely absorbed thereby.

The invention also has for an object to provide a tire of this general character including a plurality of yieldable members which may be applied to or removed from operative position with convenience and facility and wherein each of said members operates independently of the remainder.

The invention has for a still further object to provide a device of this general character wherein an annular tread member is employed formed preferably of rubber or a composition of rubber and wherein said tread member is provided with a plurality of annular passages disposed circumferentially thereof whereby the cushioning action of the tire is materially facilitated.

The invention consists in the details of construction and in the combination and arrangement of the several parts of my improved tire whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1:
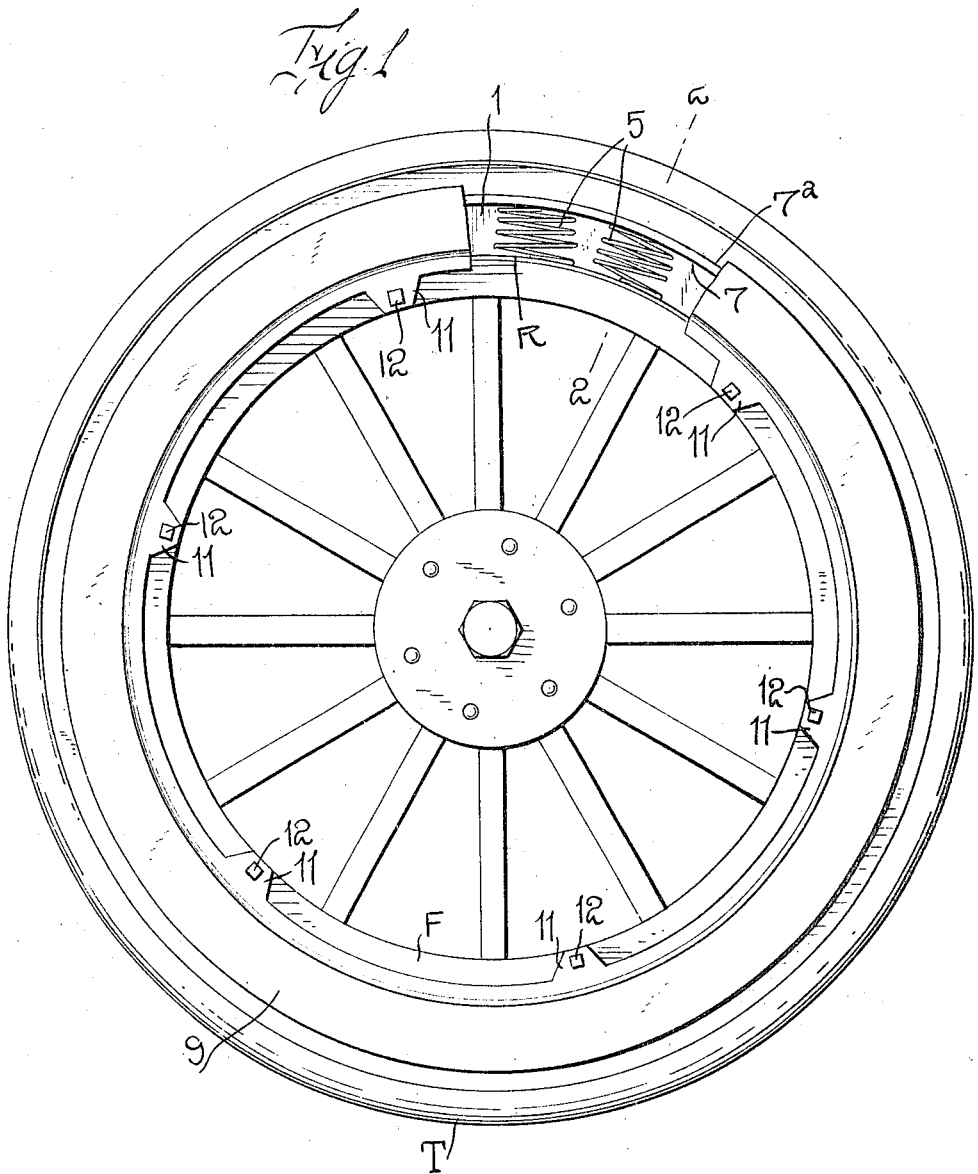
Figure 1 is a view in elevation with a portion broken away of a wheel constructed in accordance with an embodiment of my invention.

As disclosed in the accompanying drawings, F denotes the felly of a wheel which has affixed to the periphery thereof the rim R provided at one side with the outstanding marginal flange 1 which is arranged perpendicularly to the rim R and which has its outer marginal portion provided with the continuous bead or rib 2 inwardly directed.

The rim R at substantially its transverse center is provided with a series of circumferentially spaced openings 3 in each of which is adapted to be seated a longitudinally directed extension 4 arranged at the axial center of an expansible member 5 herein disclosed as a conventional coil spring of requisite tension. The opposite or outer end of the member 5 is provided at substantially its axial center with the pointed extension 6 which is adapted to penetrate the annular flexible member 7 of any suitable material but preferably canvas filled with rubber or oil in order to afford a maximum of strength, although I do not wish to be understood as limiting myself to any particular material or composition.

Overlying the flexible member 7 is the annular member 8 which is also flexible and preferably formed of hingedly connected plates, although if preferred the same may be produced from wire or other material which may be employed with the same facility. The member 8 serves to control the limit of expansion of the members 5 for a purpose which is believed to be clearly apparent to those skilled in the art to which my invention appertains.

T denotes a tire formed of rubber or any desired combination with rubber which surrounds the member 8 and extends beyond the flange 1 of the rim R, and said tire T is substantially T-shaped in cross section with the head portion disposed outwardly and with the periphery of said headed portion suitably rounded in order to afford the requisite engagement with a supporting surface.

9 denotes a removable flange coacting with the side of the rim R opposite to the flange 1 and the outer marginal portion of said flange 9 is also provided with the inwardly directed annular bead or rib 10. The beads or ribs 2 and 10 are adapted to overlie the marginal portions of the member 7 and it is also to be noted that the member 8 is of a width less than the width of the member 7 so that the member 8 does not contact with the flanges 1 and 9, whereby the resultant noise and wear is eliminated.

To further assure that the member 8 does not contact with the flanges 1 and 9, I provide the marginal portions of the member 7 with the outstanding circumferentially disposed beads or flanges 7ª between which the member 8 is positioned.

The inner margin of the flange 9 is provided with the ears 11 adapted to overlie the adjacent side of the felly F and be secured thereto by the removable fastening members 12 whereby it will be perceived that the flange 9 may be readily and conveniently removed or applied as the requirements of practice may dictate. It is also to be observed that the flange 9 is provided adjacent its inner margin with the annular rib 14 adapted to contact with the rim R, whereby the fastening members 12 are relieved of strain when the wheel to which my improved tire is applied is under load.

I have also found it of material advantage to provide the tire T with a plurality of circumferentially disposed annular compartments 16 and as herein embodied I have two of said compartments 16 arranged side by side in the head or tread portion of the tire T with a single annular compartment 17 arranged in the body portion of the tire. I prefer to have said chamber 17 of a diameter in excess of the diameter of each of the compartments 16 and interposed substantially intermediate of the compartments 16. In practice it has been fully demonstrated that these compartments 16 and 17 materially increase the cushioning action of my improved tire.

Figure 2:
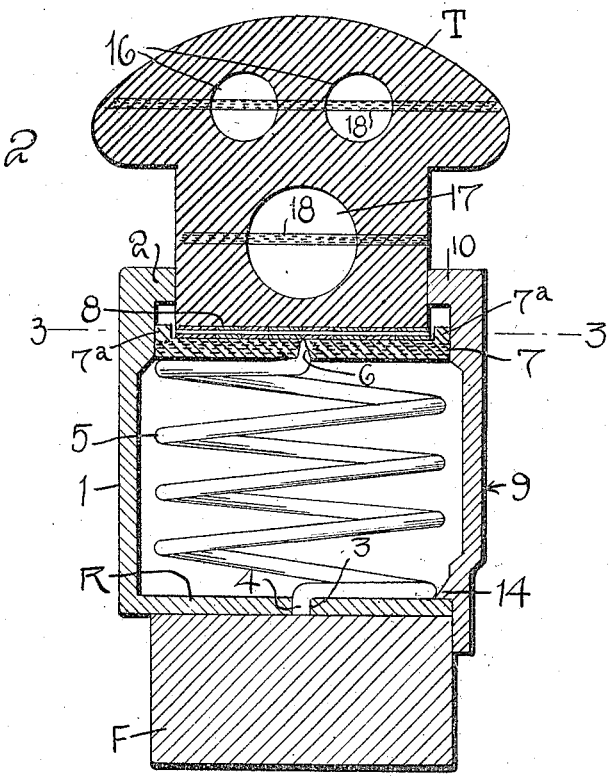
Fig. 2 is an enlarged sectional view taken substantially on the line 2—2 of Fig. 1.
Figure 3:
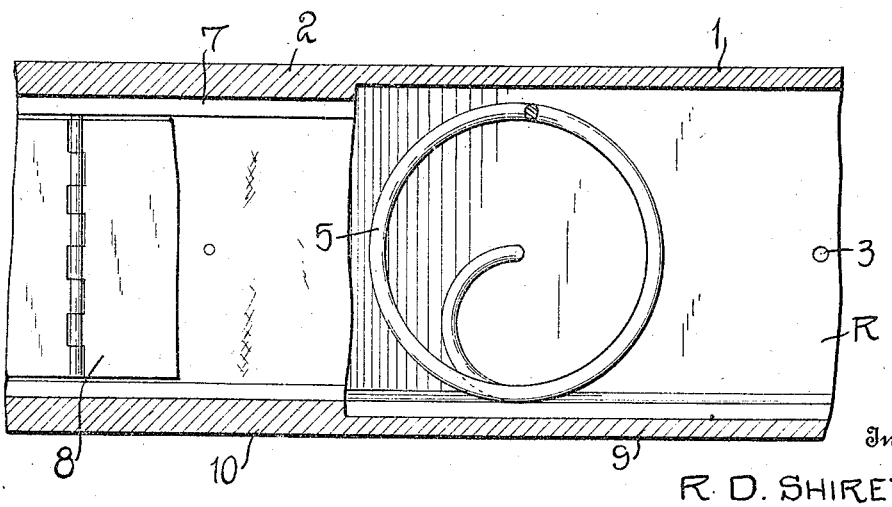
Fig. 3 is a sectional view taken substantially on the line 3—3 of Fig. 2.

I also find it of advantage to reinforce the tire T with the laminations 18 of canvas or the like which are embedded within the tire T and as is particularly disclosed in Fig. 2, it is to be noted that these laminations 18 intersect the annular chambers or compartments 16 and 17 so that said chambers or compartments are effectively held against spreading when the wheel is under load.

From the foregoing description, it is thought to be obvious that a tire constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In combination with the rim of a wheel provided with outwardly directed marginal flanges, an annular flexible member positioned between the flanges, expansible means interposed between the flexible member and the rim, a tire arranged around the flexible member, and an annular inextensible member interposed between the tire and the flexible member for limiting the expansion of the expansible means, said annular flexible member being provided with outwardly directed circumferentially disposed beads between which the annular inextensible member is positioned.

2. In combination with the rim of a wheel provided with outwardly directed marginal flanges, an annular flexible member positioned between the flanges, expansible means interposed between the flexible member and the rim, a tire arranged around the flexible member, an annular series of hingedly connected plates interposed between the tire and the flexible member for controlling the expansion of the expansible means, said annular flexible member being provided with outwardly directed circumferentially disposed beads between which the annular series of plates is positioned.

3. In combination with the rim of a wheel provided with outwardly directed marginal flanges, an annular flexible member positioned between the flanges, expansible means interposed between the flexible member and the rim, a tire arranged around the flexible member, and an annular inextensible member interposed between the tire and the flexible member for controlling the expansion of the expansible means, said annular inextensible member being of a width less than the width of the annular flexible member.

In testimony whereof I hereunto affix my signature in the presence of two witnesses.

RALPH DEAN SHIREY.

Witnesses:
L. W. EDWARDS,
DE SALES RYAN.

Copies of this patent may be obtained for five cents each, by addressing the "Commissioner of Patents, Washington, D. C."